Dec. 31, 1957 R. V. MARSH 2,818,161
TRAY-TRANSMISSION APPARATUS FOR RESTAURANTS
Filed June 15, 1955 4 Sheets-Sheet 1
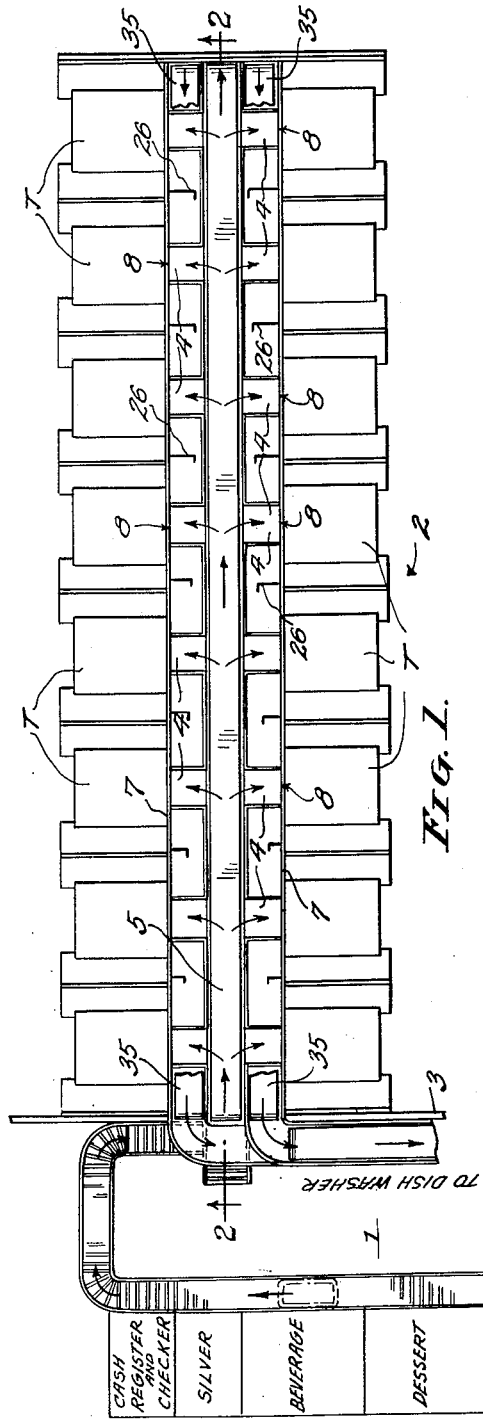
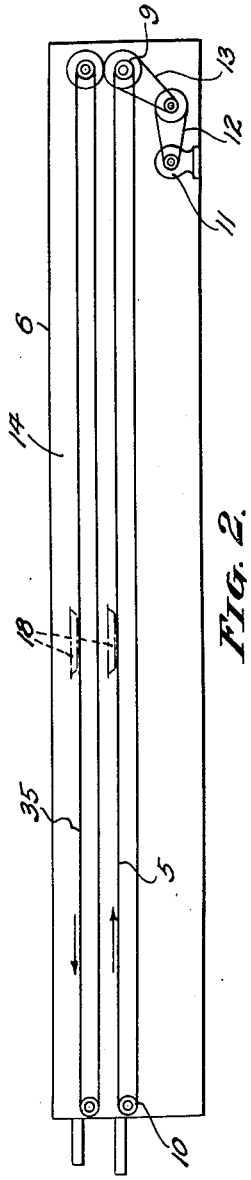
INVENTOR
R. V. Marsh
By M. V. Rambo
ATTORNEY Dec. 31, 1957   R. V. MARSH   2,818,161
TRAY-TRANSMISSION APPARATUS FOR RESTAURANTS
Filed June 15, 1955   4 Sheets-Sheet 2

INVENTOR
R. V. Marsh
BY W. N. Rambo
ATTORNEY

Dec. 31, 1957  R. V. MARSH  2,818,161
TRAY-TRANSMISSION APPARATUS FOR RESTAURANTS
Filed June 15, 1955  4 Sheets-Sheet 3
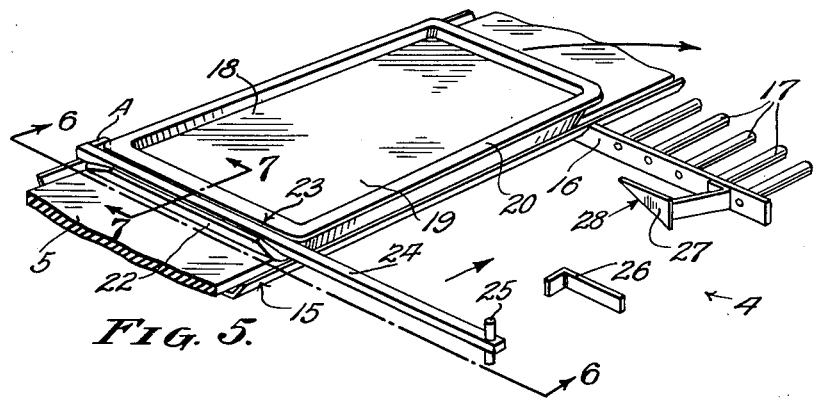
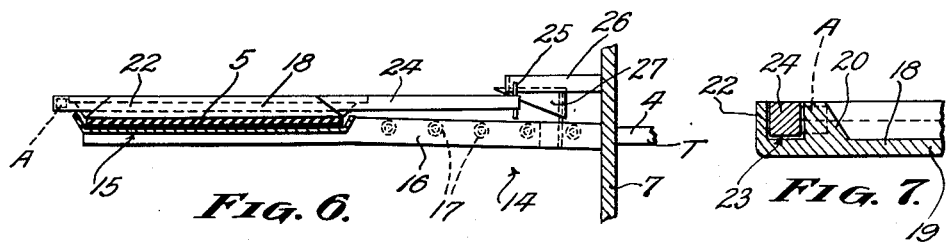
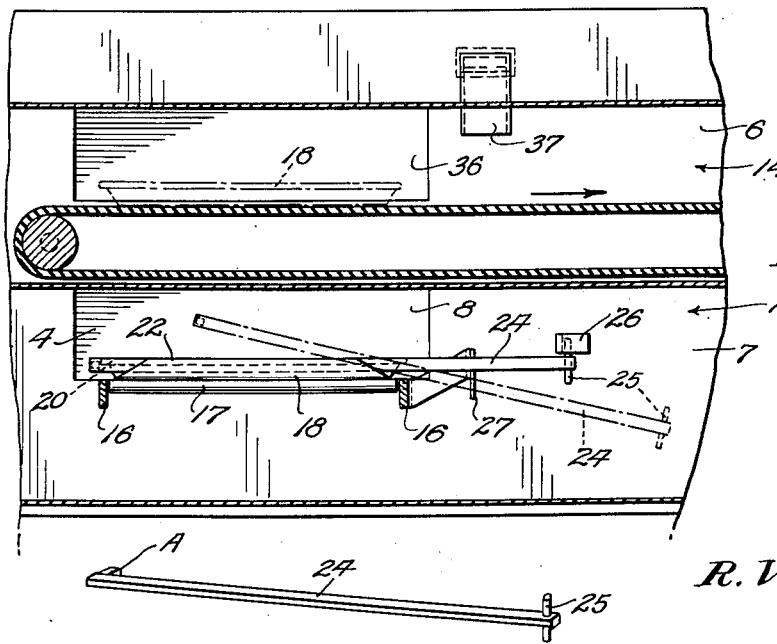
INVENTOR
R. V. Marsh
BY
ATTORNEY Dec. 31, 1957 R. V. MARSH 2,818,161
TRAY-TRANSMISSION APPARATUS FOR RESTAURANTS
Filed June 15, 1955 4 Sheets-Sheet 4
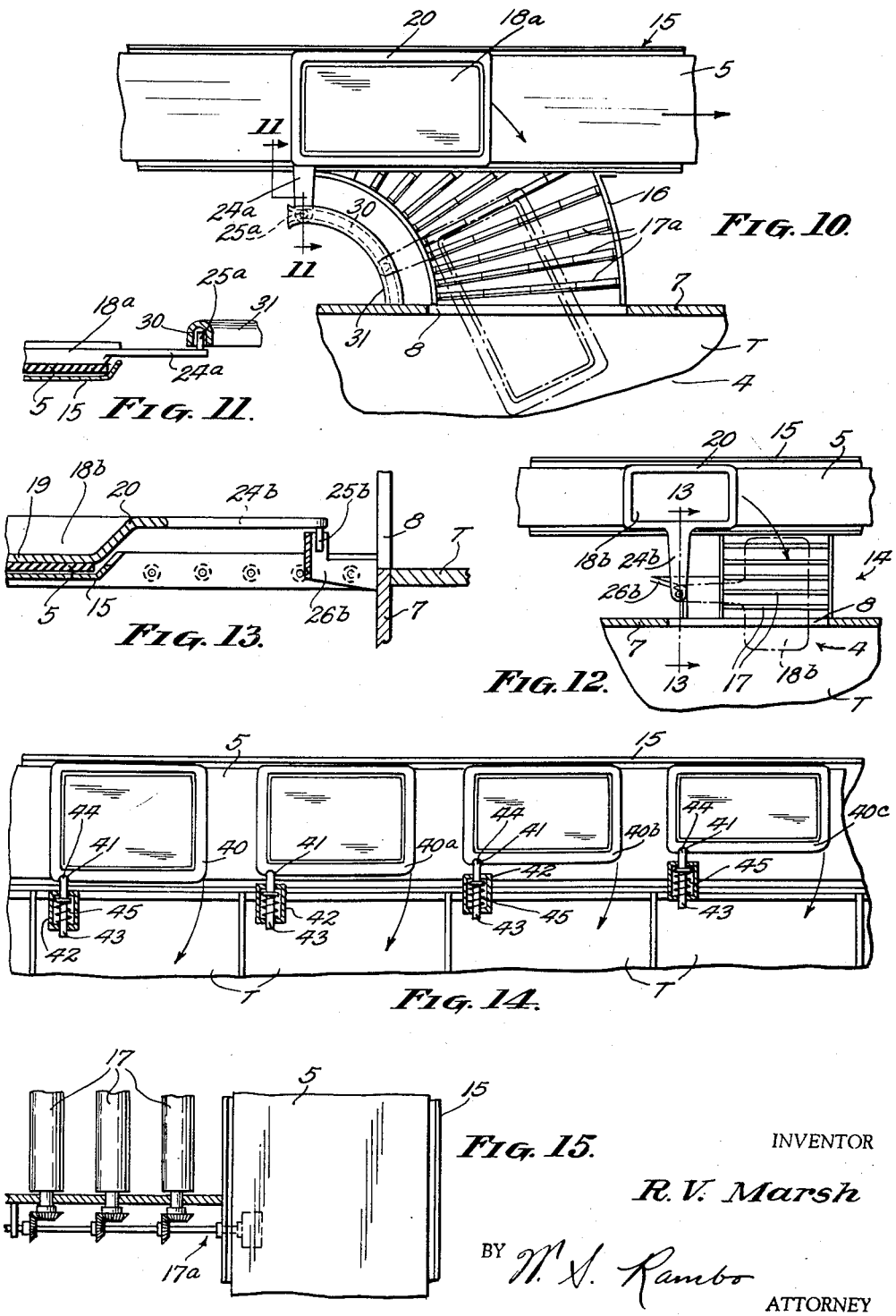
INVENTOR
R. V. Marsh
BY M. V. Rambo
ATTORNEY 2,818,161
Patented Dec. 31, 1957

2,818,161
TRAY-TRANSMISSION APPARATUS FOR RESTAURANTS

Richard V. Marsh, Columbus, Ohio

Application June 15, 1955, Serial No. 515,616

7 Claims. (Cl. 198—38)

This invention relates to food-transferring apparatus, and has particular reference to conveyor-type apparatus suitable for employment in restaurants for transferring prepared foods from kitchens, or other service areas, to selected positions of discharge.

Unsatisfactory service in restaurants, from a customer's standpoint, is founded largely on the failure of restaurant operatives to perform their required functions promptly and without protracted delays; particularly delays such as those incident to the taking of food orders; slowness in carrying prepared foods while hot and freshly prepared from a kitchen to patrons ordering the same; the delays encountered in obtaining a check or statement from an attendant for charges for items of food served; and the payment of gratuities to attendants. To alleviate these and other conditions, the present invention provides a mechanical system for restaurants, the system being so formed and arranged as to minimize the need for attendants, the same utilizing novel conveyor means for mechanically transmitting prepared foods on trays between kitchen areas and a plurality of customer positions or tables and depositing the trays in a safe, intact manner before the patrons.

The present invention further aims to provide improved apparatus for discharging food-filled trays in rapid, orderly succession from a continuously moving longitudinally extending, primary conveyor and selectively depositing the trays at any one of a plurality of customer positions or tables which are disposed at longitudinally spaced intervals on one or more sides of a housing enclosing the apparatus.

Other aims of the present invention are: to provide restaurant mechanism for transmitting expeditiously and safely trays containing prepared foods; a mechanism wherein the trays are removably deposited on a continuously movable, linearly extending, primary conveyor and are adapted to be removed bodily therefrom; to so construct and arrange the mechanism that when a given tray containing a prepared food order arrives at a preselected table or other position of discharge, said tray will be caused to turn bodily in a horizontal plane and moved to a position of discharge laterally of the conveyor; to provide supplemental conveyor means arranged for conducting the trays, without interruption in the sustained movement thereof, from the primary conveyor to a position of table deposit; to provide means by which a tray so removed from a primary conveyor is disposed in laterally offset, perpendicular relation thereto; to provide a system of this character in which food-filled trays may be placed in closely adjacent, longitudinal order on the primary conveyor and delivered rapidly and successively without relative interference to one or more preselected receiving stations; to provide a novel tray construction for such transfer systems, wherein each tray body is formed with means adapting the same for engagement with stationary frame-carried devices, the latter serving to turn the trays engaged therewith horizontally, removing the same from said conveyor and depositing the trays on selected customer tables; and to provide a system of this character which is simple and economical in construction, reliable and efficient in operation and which constitutes an improvement generally in the art to which it relates.

With these and other objects, purposes and advantages in view, the present invention consists in the novel features of construction, combinations of elements and arrangement of parts, as hereinafter more fully described and pointed out in the appended claims.

In the drawings, which form a part of this specification, and in which similar characters of reference denote like and corresponding parts throughout the several views thereof:

Fig. 1 is a diagrammatic top plan view disclosing the relative order and positions of the parts of my improved restaurant service system;

Fig. 2 is a view taken on the plane disclosed by the line 2—2 of Fig. 1 and illustrating in side elevation the primary conveyor for transferring trays containing prepared food trays to customer positions and a parallelling secondary conveyor for returning trays and used dishes and transmitting written food orders to the kitchen area of a restaurant;

Figure 4:
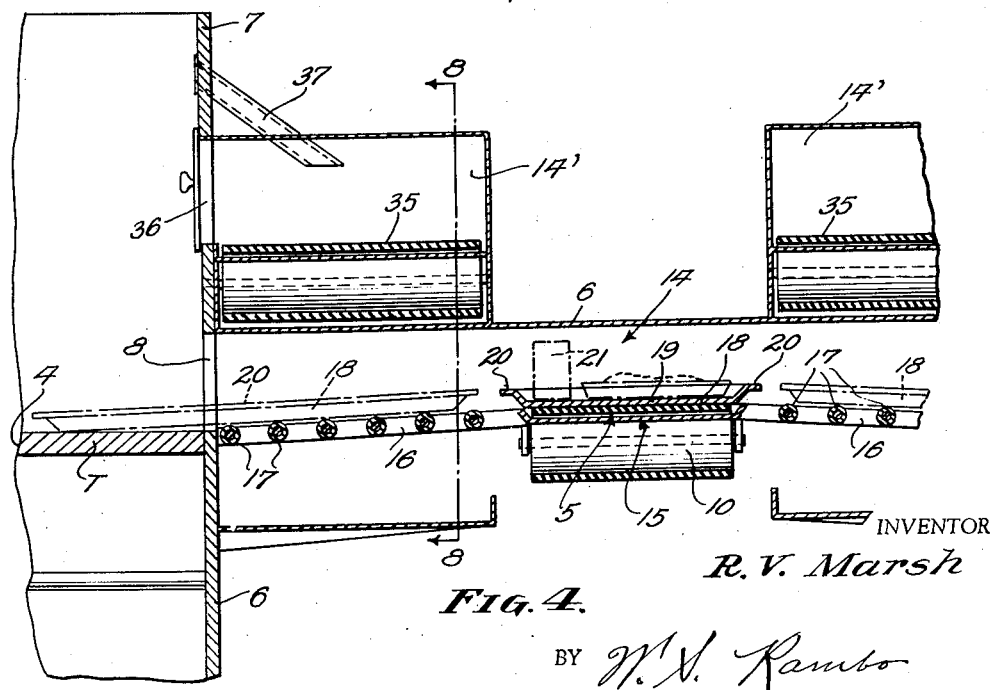
Fig. 4 is a vertical transverse sectional view on the line 4—4 of Fig. 3.

Fig. 5 is a detail perspective view of a tray formed in accordance with the present invention and disclosing its position when mounted on a primary conveyor for movement in unison therewith, the removable bar or turning extension of the tray being shown in its seated position in a groove provided therefor in one end of the tray, the stud on an outer end of the bar or extension being shown in a position adapted for engagement with associated stationary, casing carried, fulcrum and bar-discharging brackets;

Fig. 6 is a vertical transverse sectional view taken on the line 6—6 of Fig. 5;

Fig. 7 is a detail vertical longitudinal sectional view on the line 7—7 of Fig. 5;

Fig. 8 is a fragmentary vertical longitudinal sectional view taken approximately on the plane indicated by the line 8—8 of Fig. 4 and illustrating in full lines a tray positioned on the rollers of a discharge conveyor;

Fig. 9 is a detail perspective view of a tray-turning bar or extension device used on each tray containing ordered food and employed in the controlled and selective delivery of such trays to different customer positions or stations, the bar or extension device being used for turning the trays when the same are undergoing removal from a primary conveyor and being delivered to a customer station in a position perpendicular to that occupied by the tray when on the primary conveyor;

Fig. 10 is a fragmentary top plan view disclosing a modified form of the apparatus employed by the present invention;

Fig. 11 is a detail transverse sectional view taken on the line 11—11 of Fig. 10;

Fig. 12 is also a fragmentary top plan view disclosing a further modified form of the present invention;

Fig. 13 is a detail sectional view taken on the line 13—13 of Fig. 12;

Fig. 14 is a diagrammatic top plan view, partly in horizontal section, of a further modified form of the invention;

Fig. 15 is a detail view of means for imparting power to the rotating antifriction device of the supplemental conveyors.

Referring to the drawings, there has been diagrammatically illustrated in Figs. 1 and 2 a restaurant or other dining hall having a food-preparing or kitchen area 1 and a dining room or customer area 2, the areas 1 and 2 being shown as separated by a wall 3. The apparatus of the present invention is applicable to any well-known type of restaurant construction, such as the counter-service type in which customers are seated on stools, table-type restaurants in which prepared foods are brought by attendants to patrons seated around spaced tables, or to the well-known booth type of restaurant in which customers are usually seated in pairs on opposite sides of tables T projecting outwardly from a wall.

As will be more fully appreciated from a reading of the following description, the apparatus of the present invention may be advantageously employed in each of these different types of eating establishments; first, in conveying foods to anyone of a plurality of delivery stations 4 located nearest to customers seated before a counter, or to customers placed around spaced, individual tables of a room. In both these types, while the services of manual attendants may be used to limited degree in serving prepared foods, the attendants are not required to go back and forth between their serving stations and a kitchen, since the conveying mechanism herein provided performs the major part of the work of transferring prepared dishes to the receiving stations for patron acceptance and returning used or soiled dishes to the kitchen area. In the booth type of restaurant, however, the present invention finds its maximum usefulness; especially with respect to its ability to deliver trays containing prepared dishes automatically to booth-seated patrons, as well as transmitting patron-marked food orders, together with payment therefor, from the patrons to the kitchen area or department. In Figs. 1 through 9, therefore, the present invention has been specifically illustrated in connection with the booth-type restaurant.

In accordance with the present invention, use is made of an elongated primary conveyor 5. As here shown this conveyor is of the endless belt, continuously driven type. However, it will be understood that other equivalent types of conveyors may be used for the purposes of the invention. In this instance, the conveyor is positioned in a concealed, noise-suppressing housing 6. The housing, as here shown, is provided with spaced, vertical side walls 7 which in the customer area 2 of the restaurant are formed with longitudinally spaced tray-discharging openings 8.

Figure 3:
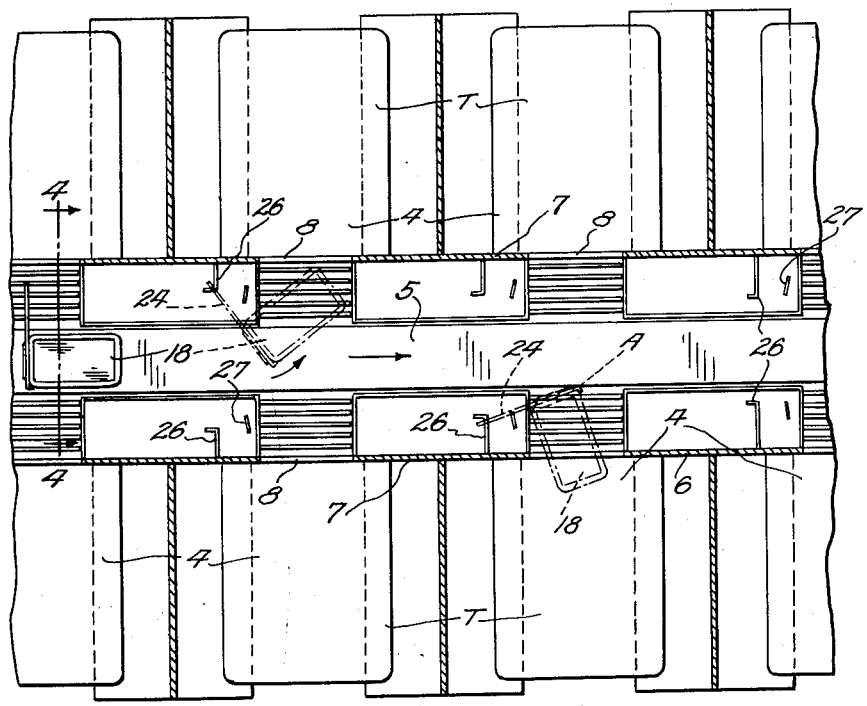
Fig. 3 is an enlarged, fragmentary, horizontal sectional view taken through the tray-discharging positions or stations of the apparatus.

As shown in Fig. 2, the belt of the primary conveyor at the opposite ends thereof passes around drive and guide rolls 9 and 10, respectively. The belt may be driven by an electric operating motor 11, or its equivalent, which through belt drives, shown at 12 and 13 in Fig. 2, apply power to the roll 9 in providing controlled but normally continuous motion on the part of the conveyor. The conveyor 5, as shown in Fig. 3, is disposed to occupy the longitudinal central region of the conveyor tunnel 14 as formed by the housing 6. As here disclosed, the upper, horizontally extending tray-advancing run or length of the conveyor is substantially coextensively positioned in a rigid, stationary, frame-mounted trough 15. This trough serves to sustain the weight of the upper belt run and also that of food trays and their contents positioned thereon.

The trough 15 is supported independently of the conveyor belt by laterally directed pairs of frame bars 16, the latter having their outer ends secured to the side walls of the housing 6 adjacent to each of the openings 8. These bars also support, preferably in slightly outwardly and downwardly inclined planes, the ends of a plurality of parallel, antifriction, tray-supporting rolls 17 which form in connection with each of the openings 8 a supplemental or tray-discharging conveyor, whereby food-containing trays 18, by means hereinafter more fully defined, are through horizontal turning movement thereof, removed from the primary conveyor and movably disposed on the rolls 17 for delivery through the openings 8 of the housing and deposit on the tables T.

In order that food-containing trays may be transmitted to a particular table, having seated there before one or more customers by whom the food was ordered, the present invention constructs the trays 18 in a special manner. Thus, the trays disclosed in Figs. 1 to 9, inclusive, are each formed to comprise a conventional, flat, plate-like body 19 having an upwardly turned marginal flange 20, the body being suitable for the positioning of various dishes, plates, cups, saucers, drinking glasses and other eating utensils 21 for the reception of prepared foods thereon. As shown in Figs. 5, 6 and 7, each tray is formed at one end thereof with a lip 22 forming an open-topped and open-ended groove or socket 23 for the removable retention therein of an extension-forming bar or arm 24.

Each bar or arm comprises a straight body, polygonal in its transverse cross section to conform with that of the groove, recess or socket 23. One end of each arm is laterally directed, as at A, to provide an indexing tray-engaging abutment in enabling the arms to occupy uniform operating positions in their sockets 23 when the food-containing trays are deposited on the primary conveyor. This is done in order that the opposite end of each arm, with respect to the abutment-carrying end, will project a predetermined distance laterally of the tray. This outer projecting end of each arm carries a vertical stud or other equivalent projection 25. It will be noted that the arms are reversibly positioned in the grooves or sockets 23, so that the stud or projection-carrying ends thereof may be arranged on one side or the other of the trays. This is done so that the trays may be discharged to either side of the conveyor through the side wall openings 8. Further, the arms used for each transversely aligned pair of openings 8 are of different length, so that the studs 25 thereon will be disposed in different laterally offset planes of longitudinal movement.

In association with this bar or arm construction, the side walls 7 of the housing 6 have rigidly secured thereto for projection inwardly and laterally of the tunnel 14 a plurality of hooks or hook brackets 26. One of these hooks is arranged as shown in Fig. 3 immediately ahead of an associated opening 8. When a loaded tray is to be removed from the primary conveyor and passed through an opening for selective deposit on a desired table, the hook device or bracket in front of that opening is of a length corresponding exactly with the line of travel of the stud or projection 25 carried by the arm of the tray to be passed through the selected opening.

In this regard it may be noted that the kitchen operative knowing from facts appearing on an order blank or check the number or other identification of the table where the tray is to be consigned, places an arm 24 of a length necessary to assure correct delivery in the recess or socket 23 of the tray before depositing the tray on the conveyor. When the tray containing this arm reaches the hook device or bracket 26 immediately preceding the table opening in the housing through which the tray is to be passed, the stud or projection 25 on the arm contacts the hooked end of the device 26. This action causes the forward motion of the arm and the tray associated therewith in unison with the conveyor to be terminated. As a result, due to forces supplied by the continuously moving primary conveyor, the tray turns about a vertical axis provided by the bracket-held stud 25. This arcuate turning movement of the tray in a horizontal plane removes the tray from the conveyor belt and swings the tray laterally upon the rollers 17 of the supplemental or discharge conveyors disposed in registry with the openings 8, causing the loaded tray so turned to be passed through the proper opening and deposited on a table in front of the customer or customers who ordered the food.

During such transference of the loaded tray from the conveyor rollers 17 to the associated table, the outer end portion of the arm 24 of a tray so undergoing table delivery, is brought into engagement with a stationary cam member 27. One of these cam members is disposed in adjacent relation to each of the housing openings 8 and may be carried by one of the frame bars 16 used in the support of the rolls or rollers 17. The position of the inclined cam edge 28 of each member 27 is such that the same will be caused to press downwardly on the outer end of an arm 24 in contact therewith. This is done in a manner displacing the arms from their normal mounted positions in the tray sockets, so that the arms will be stripped from the trays when the latter are deposited on the tables T.

In view of the foregoing, it will be clear that the characteristic feature of the present apparatus is to be found in the employment of food trays which are bodily placeable upon and removable from a carrying conveyor, and wherein each tray is provided with a laterally projecting arm of individual length, said arm carrying means on its outer end engageable with a particular, stationary, hook-like, stop device for imparting horizontal turning movement to the conveyor-advanced tray in causing its selective deposit at one of a plurality of receiving stations disposed laterally of the primary conveyor.

While the construction illustrated in Figs. 1 to 9 is well adapted in carrying out the above-defined operations, it will be understood that the specific form of my invention is exemplary of but one embodiment and that the invention may be produced with various structural modifications thereof.

For example, as shown in Figs. 10 and 11, the tray 18a carries a fixed laterally projecting arm 24a at one side thereof adjacent to its trailing edge. The outer end of this arm is formed with an upstanding pin or projection 25a which is positioned to enter an arcuate guide groove 30 formed in a stationary bracket 31 projecting from the side wall of a conveyor housing. It will be understood that a bracket 31 is used ahead of each tray-discharging opening 8, so that the entrance ends of the grooves 30 in such brackets will be disposed to align with the pins or projections 25a on the different length tray arms 24a, each arm being of a length to cause the tray formed therewith to turn from the primary conveyor for passage through a particular opening 8. The arms 24a may be either rigidly or removably formed with the trays 18a. Also, as shown in Fig. 10, the rolls or rollers 17a are arranged radially about the projected axis of turning movement of the trays.

In Figs. 12 and 13, another variant has been disclosed wherein the arm extension 24b projects integrally from one side of the tray 18b substantially midway of its length, and has its outer end formed with a rigid projection 25b adapted for tray-turning engagement with a bracket device 26b.

The rolls or other equivalent antifriction elements 17 of the supplemental conveyor may be power driven by the drive means indicated at 17a in Fig. 15.

With the use of the above-described apparatus, orders may be handled promptly and delivered in rapid succession to one or more receiving stations without spillage and with speed and accuracy. These conditions are attributable largely to the fact that the prepared food is placed on trays, and, to the means for turning the trays arcuately and laterally when undergoing discharge from the main conveyor and delivery to the several receiving stations. Also, during this turning movement, the trays are supported on movable supplemental conveyors here disclosed as comprising the frame-mounted rolls or rollers 17. The latter enable the traps to turn quickly, freely and without undue friction, so that the same will not interfere with a following tray mounted on the primary conveyor immediately to the rear of the tray undergoing discharge and table delivery.

In the form of the apparatus illustrated in Figs. 3 and 4, a belt-type return conveyor 35 is shown as being arranged within the tunnels 14' of the housing at positions immediately above and at each side of the primary conveyor 5 in parallel order therewith. These return conveyors may be used for returning soiled dishes and other eating utensils to the kitchen area. The side walls 7 of the housing may be provided with door-controlled openings 36, enabling an attendant to gather and remove soiled dishes from a table and place the same on one or the other of the belts of the return conveyors for transfer to the kitchen area.

Also, the walls 7 are, adjacent to each table or station T, provided with a chute 37. These chutes terminate within the confines of the housing 6 above the upper runs of the return belts 35. In the automatic or non-manual system made possible through the apparatus illustrated in Figs. 1 to 9, a customer seated at one of the tables T, marks an order blank, not shown, to indicate the foods appearing in menu form on the order blank. When the order has thus been made out by the customer, the latter totals the charges for the various items ordered and places the marked order, together with money in payment therefor, in a money-receiving pocket or envelope forming a part of the order blank. This ordering device, which bears the identifying number of the table at which the ordering customer is seated, is then deposited in a chute 37 adjacent the table and is transferred by a retuurn conveyor 35 to the kitchen area, where the ordering device is manually removed. The food ordered thereby is then prepared and placed by kitchen operatives upon a tray provided with an extension arm of the required length to effect delivery of the tray carried ordered food to the proper table, together with any change in money due the customer for the order. As above defined, such a tray is then delivered to the table at which the ordering customer, or customers, is seated and deposited automatically thereon. Usually, such a restaurant employs attendants who remove the individual dishes or prepared food items from the delivered tray and arrange the same in proper order before the customer, although this service too may be performed by the served customer.

In the variant structure illustrated in Fig. 14, the trays 40, 40a, 40b and 40c each possess a different width and are provided at the sides thereof adjacent to their ends with recesses 41. The walls of the housing are formed with casings 42 which slidably receive plungers 43 having rounded heads 44 formed on their inner tray-engaging ends. Surrounding each of the plungers within the casing 42 thereof is a coil spring 45 which bears on the plunger to force the same normally toward the trays positioned on the conveyor belt 5.

Due to the variance in width of the trays 40 through 40c, the arrangement disclosed in Fig. 14 provides for the removal of the wider tray 40 at the first discharge station in the length of the belt, the next wider tray 40a at the next station and so on. The plungers 43 are positioned so that a tray to be discharged by the action of a particular plunger will be sufficiently wide to engage the headed outer end 44 of the plunger to move the latter longitudinally against the force of its associated spring 45, so that the head 44 may be positively forced by the spring into the notch or recess 41 at the side of the tray to be removed.

This positioning of the plunger in the tray recess stops the forward progress of the tray in unison with the conveyor belt but through the sustained motion of the belt, the plunger-engaged tray turns bodily horizontally about a fulcrum point supplied by the plunger-recess construction. The laterally turned tray is then engaged by the walls of the supplemental conveyor means for discharge of the tray upon a table or counter. In this form of my invention, the tray is devoid of laterally projecting elements and its deposit on preselected tables is effected by the varying width of the trays and the lengths of the plungers adapted for engagement therewith. In this form of my invention, as in the previously described forms thereof, the trays are bodily removed from the conveyor through selective engagement of said trays with stationary frame or housing-mounted fulcrum stops, the power of the continuously moving primary conveyor being utilized in producing the turning movement of the trays about said fulcrum stops in removing the trays completely from the conveyor at selected positions of discharge and final deposit.

While I have illustrated and described certain preferred embodiments of my invention in some considerable detail, nevertheless it will be understood that this disclosure has been made to furnish a clear and precise understanding of the essential features and mechanical aspects of my invention and not necessarily by way of restriction or limitation, since at all times I desire to include within the boundaries of my invention all structural variations or modifications thereof falling within the spirit and scope of the appended claims.

I claim:

1. A tray for conveyor delivery systems, comprising: a rectangular body suitable for the support of articles thereon, said body being formed along its rear transverse edge with a coextensive open-topped socket; an arm projecting horizontally and laterally from either side of said tray body, said arm having an inner portion movably positioned in and held by the body socket; and a rigid vertical projection formed with the outer end of said arm.

2. A tray for application to conveyor-type food-transporting conveyors, comprising: a flat, normally horizontally disposed, rectangular body having a marginal flange formation, said formation at one end of the body including an open-topped longitudinally extending socket-forming groove; a reversible arm member having an inner portion receivable in and coextensive with said groove and an outer portion projecting laterally in spaced relation from one side or the other of said tray body; a horizontally and laterally offset projection formed on the end of the inner portion of said arm member for position-indexing engagement with a side of said body; and a vertically extending guiding projection formed with the end of the outer portion of said arm member, adapted for movement control of said tray when the latter is positioned on an associated conveyor.

3. A tray for use in connection with endless food-transporting conveyors, comprising a flat, rectangular, article-receiving, body grooved transversely at one end a rigid arm movably positioned in said groove and projecting horizontally and laterally from at least one side of said tray body; and a vertically extending guiding projection formed with the outer end of said arm.

4. In food-conveying apparatus; a tray formed to provide a flat body grooved at one end; an arm movably positioned in said groove and projecting horizontally and laterally from one side and in the horizontal plane of said body; a vertically disposed guiding projection formed with the outer end of said body; an elongated longitudinally extending movable support for said tray body; and a stationary device arranged adjacent said support in the path of movement of said projection, the engagement of said projection with said device serving to produce horizontal turning movement of said tray in removing the same from said support.

5. A tray for use in restaurant conveyor systems, comprising a flat, rectangular body formed at one end thereof with a transversely extending groove, coextensive with the full width of the tray body, and a reversible stop-engaging arm slidably positioned in said groove, said arm being disposed in the horizontal plane of the tray body and of such length as to project horizontally and laterally from one side or the other of the tray body for engagement with an associated stationary, tray-turning stop means.

6. Restaurant conveyor apparatus comprising: an elongated, continuously movable, endless belt conveyor; flat, rectangular food-receiving trays positionable on said conveyor for movement in unison therewith, each of said trays being formed along a rear transverse edge thereof with a transversely coextensive socket; a housing in which said conveyor is positioned, said housing including a side wall extending parallel with and adjacent to said conveyor and formed with longitudinally spaced, tray-discharging openings; turning arms removably carried in the sockets of said trays, said arms projecting rigidly, horizontally and laterally outwardly for variable distances in a single plane from said trays on either side thereof; variable length, stationary stop and fulcrum-providing means carried by said housing contiguous to each of said side wall openings, said stop means being disposed in the horizontal plane of said arms for engagement with said arms during movement of said trays with said conveyor, engagement of said arms with said stop means serving to produce bodily horizontal turning movement of the associated trays about substantially vertical axes passing through said stop means to remove said trays from said conveyor and turn the same to perpendicular positions relative to said conveyor for movement through said wall openings, whereby to cause trays so actuated to assume stationary positions of deposit disposed exteriorly of said housing and in registry with the wall openings thereof; and cam means mounted in connection with said housing for removing said arms from the sockets of said trays during transference of said trays from said conveyor to said positions of deposit.

7. A tray for conveyor delivery systems comprising a rectangular body suitable for the support of an article to be conveyed and formed along an edge thereof with arm-receiving socket means; an arm having an inner end portion removably carried in said socket means and projecting horizontally and outwardly with respect to said body, said arm being movable in said socket means to vary the extent of outward projection thereof with respect to said body; and a rigid vertical projection on the outer end portion of said arm.

References Cited in the file of this patent

UNITED STATES PATENTS

| | | |
|---|---|---|
| 2,292,890 | Mitchell | Aug. 11, 1942 |
| 2,600,038 | Whaley | June 10, 1952 |
| 2,640,581 | Abitz | June 2, 1953 |
| 2,662,382 | Potchen | Dec. 15, 1953 |
| 2,679,920 | Steele | June 1, 1954 |